May 25, 1926.  
M. BRUTZKUS  
1,586,508  
APPARATUS FOR CHEMICAL PRODUCTION AND RESEARCH  
Filed August 4, 1920  8 Sheets-Sheet 1
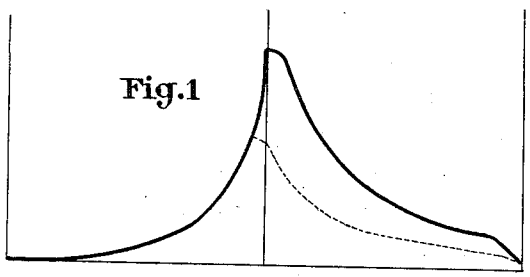
Fig.1
Fig.5
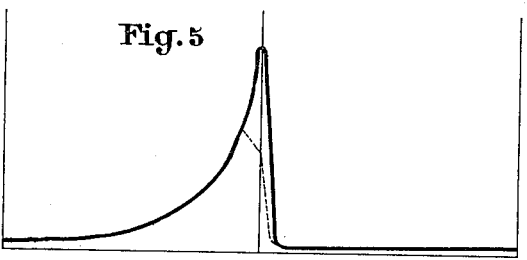
Fig.3
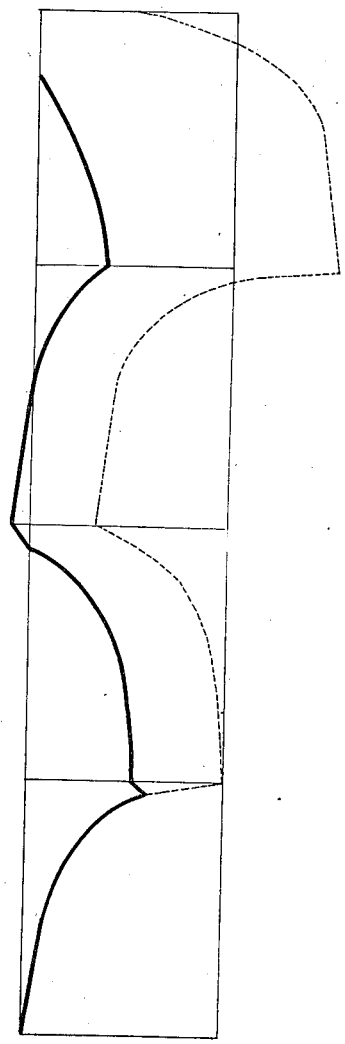
Fig. 10
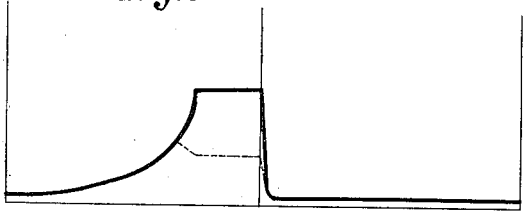
Fig.7
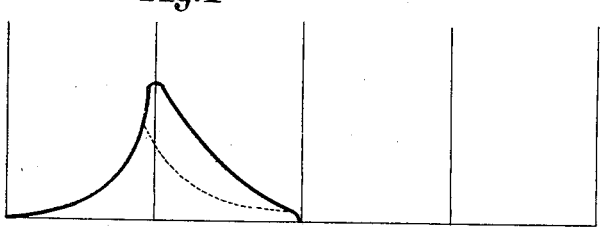
Fig.9
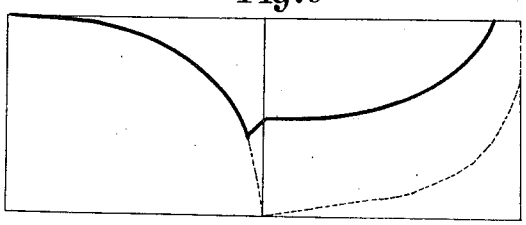
INVENTOR:
Marcus Brutzkus
By Lawrence Langner
ATTORNEY.

May 25, 1926.  1,586,508
M. BRUTZKUS
APPARATUS FOR CHEMICAL PRODUCTION AND RESEARCH
Filed August 4, 1920   8 Sheets-Sheet 2

INVENTOR:
Marcus Brutzkus
By Lawrence Langner
ATTORNEY

May 25, 1926.
M. BRUTZKUS
1,586,508
APPARATUS FOR CHEMICAL PRODUCTION AND RESEARCH
Filed August 4, 1920   8 Sheets-Shee 3
Fig. 11
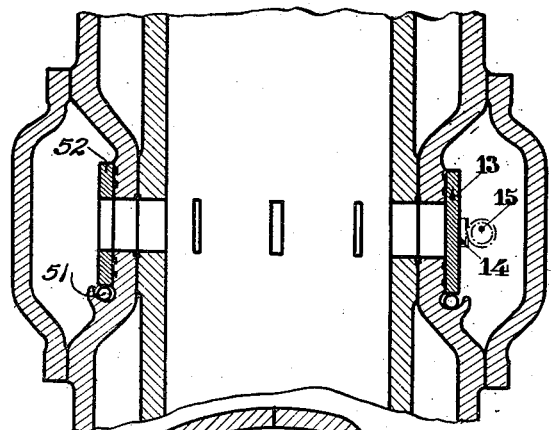
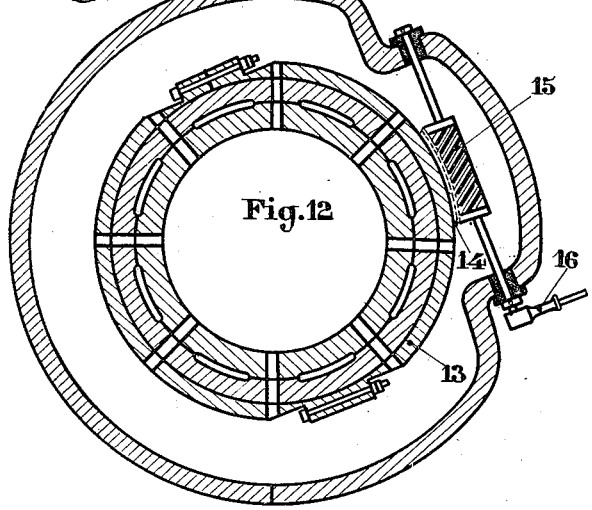
INVENTOR:
Marcus Brutzkus
By Lawrence Langner
ATTORNEY.

May 25, 1926. 1,586,508
M. BRUTZKUS
APPARATUS FOR CHEMICAL PRODUCTION AND RESEARCH
Filed August 4, 1920 8 Sheets-Sheet 4
Fig. 13ª
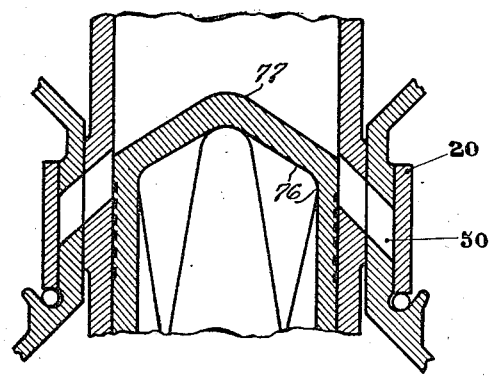
Fig. 30
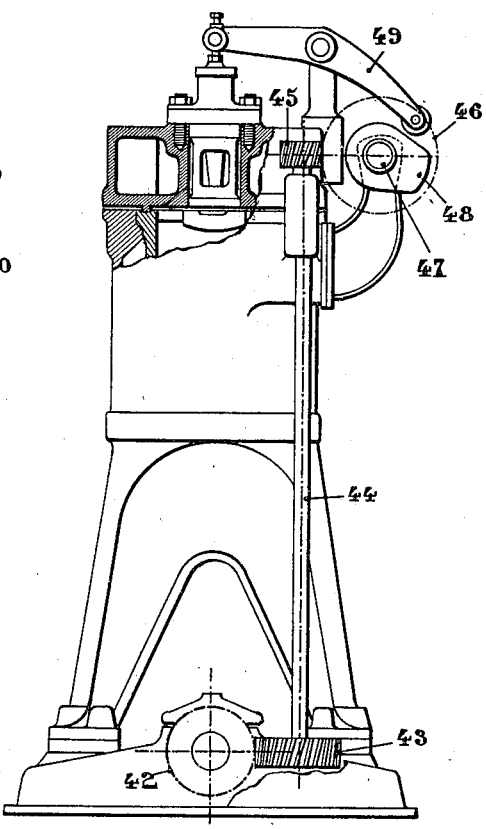
Fig. 13ᵇ
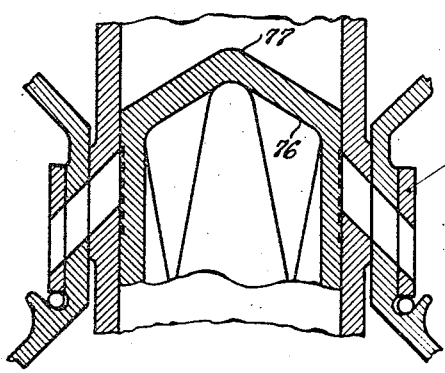
Inventor
M. Brutzkus
by Lawrence Langner
Atty.

May 25, 1926.

M. BRUTZKUS

APPARATUS FOR CHEMICAL PRODUCTION AND RESEARCH

Filed August 4, 1920   8 Sheets-Sheet 5

INVENTOR:
Marcus Brutzkus
By Lawrence Langner
ATTORNEY

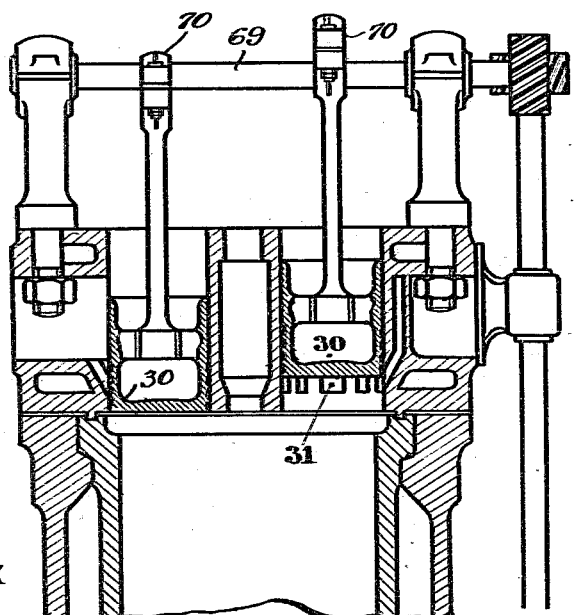
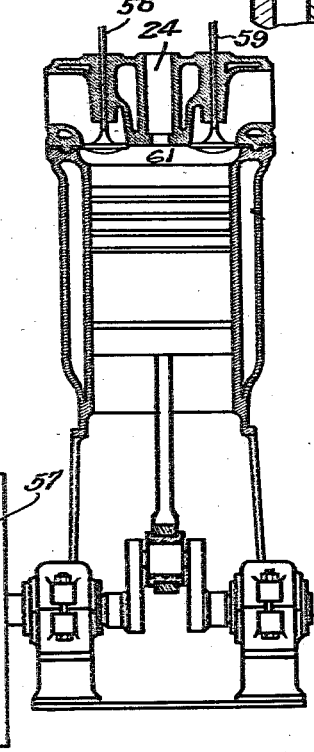
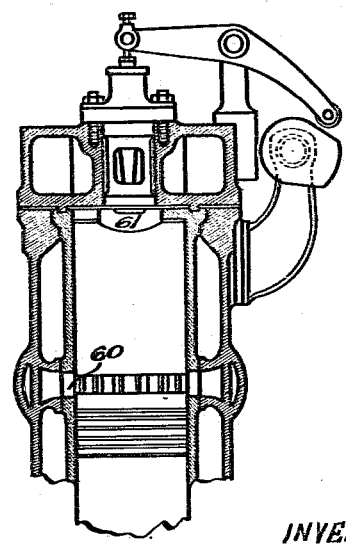

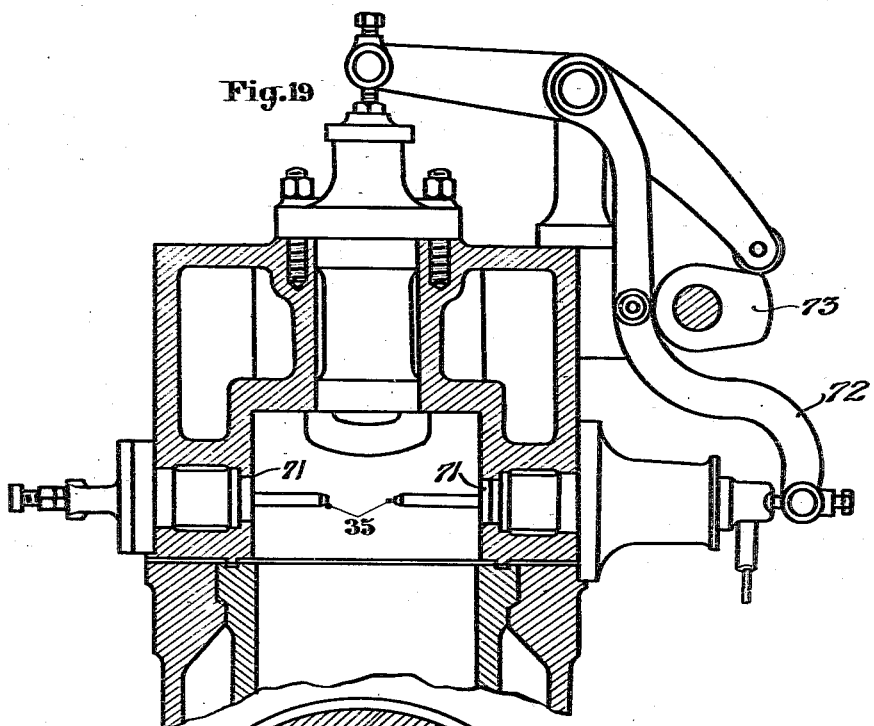
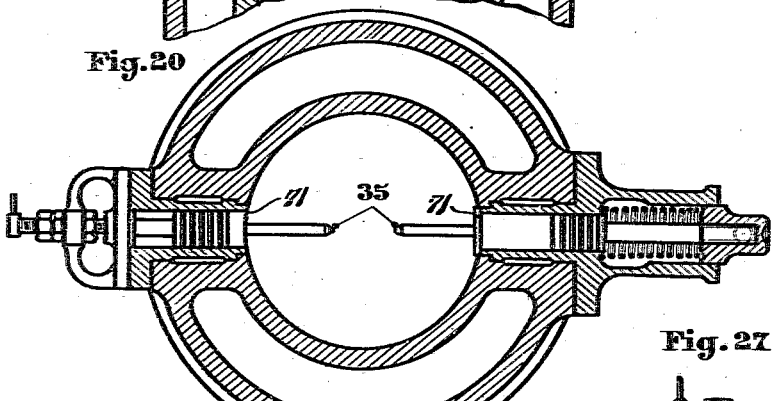
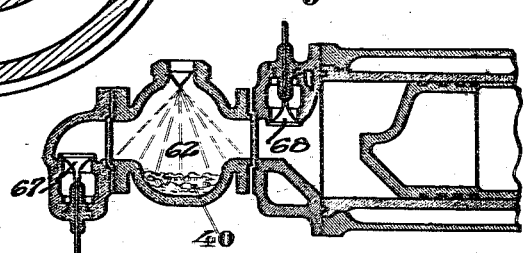
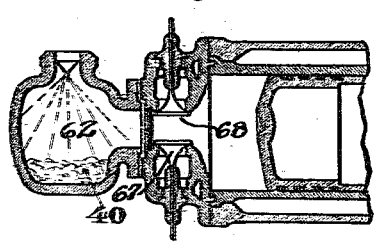

May 25, 1926. 1,586,508
M. BRUTZKUS
APPARATUS FOR CHEMICAL PRODUCTION AND RESEARCH
Filed August 4, 1920   8 Sheets—Sheet 8
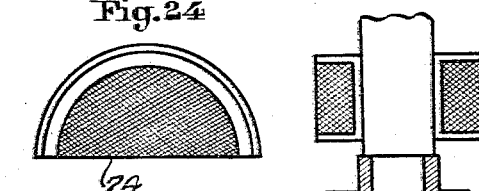
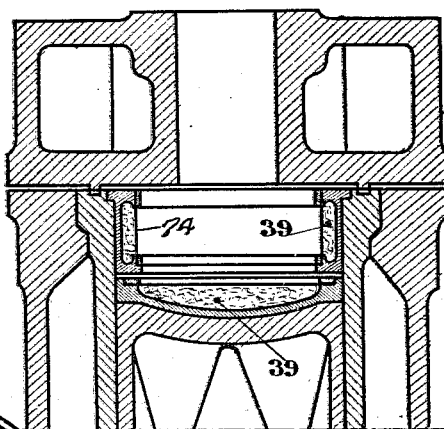
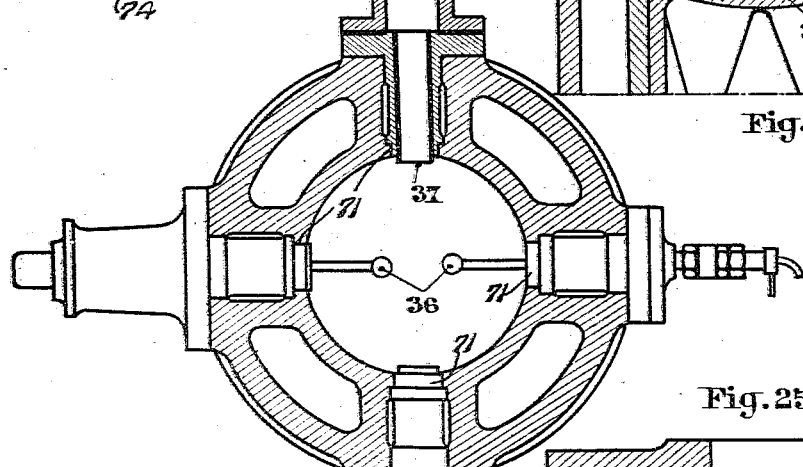
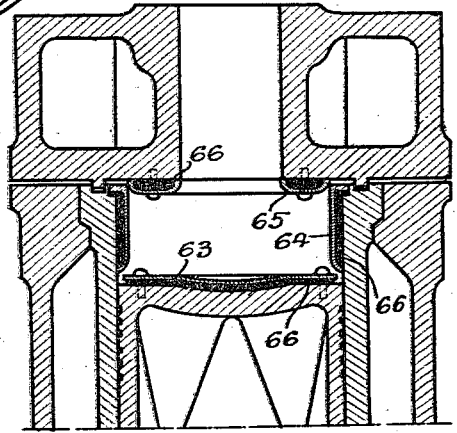
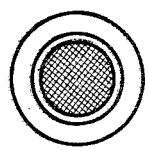
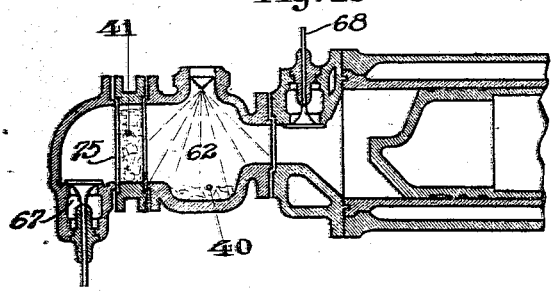
INVENTOR:
Marcus Brutzkus
By Lawrence Langner
ATTORNEY.

Patented May 25, 1926.

1,586,508

UNITED STATES PATENT OFFICE.

MARCUS BRUTZKUS, OF ZURICH, SWITZERLAND.

APPARATUS FOR CHEMICAL PRODUCTION AND RESEARCH.

Application filed August 4, 1920, Serial No. 401,167, and in Germany August 4, 1919.

This invention has for its subject an apparatus for the chemical treatment of materials, the apparatus comprising a compressor in which the chemical operations take place in the pressure space.

The apparatus is intended always to receive an exactly determined quantity of the materials to be operated upon, to mix them, to compress them to the necessary pressure, or to reduce their pressure if required, to heat them to the necessary temperature, or to cool them, to bring them into contact with the necessary catalysts, to subject the materials to the necessary physical actions, such, for instance, as that of the electric arc, spark discharges, cathode rays, or other radiations, or any physical influences, and to discharge the products so obtained from the apparatus in order that it may be ready to receive a new quantity of materials to be operated on in the same manner.

Mechanical work may be obtained as a by-product in this treatment.

In the use of the apparatus for various chemical operations or specially for chemical researches, the construction provides the possibility of varying very easily the important periods required for the chemical reactions.

In order to attain these results, the apparatus is constructed as a compressor with driving mechanism, piston, cylinder and casing, with valves, diffusers, glowing surfaces, with openings for the introduction of physical agents, with controlling mechanism for opening and closing the valves at the right moments and for setting the physical agencies in action or cutting them out and is provided with receiving chambers for the necessary catalysts in the manner hereinafter described and illustrated with reference to the drawings.

In the accompanying drawings:—

Figs. 1–10 represent pressure-diagrams for the different working processes described below.

Figs. 11 and 12 show, respectively, in vertical and horizontal section, apparatus wherein ejection of products is through slots exposed by the piston.

Figs. 13ª and 13ᵇ are fragmentary sectional views in different operative positions of the apparatus of Figs. 11 and 12.

Figure 14:
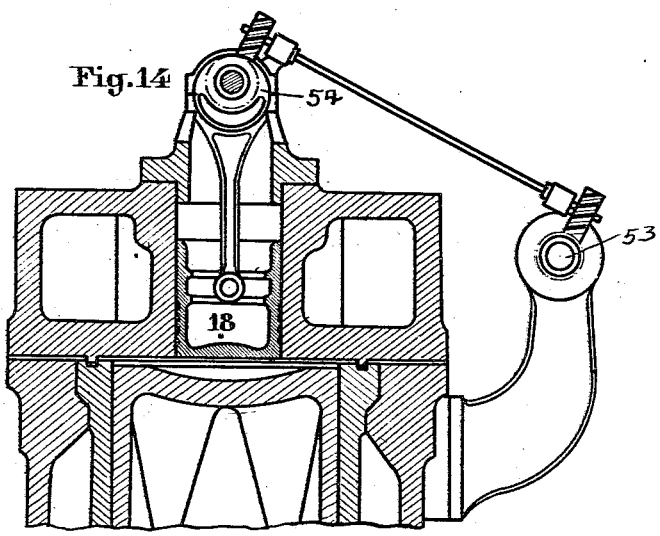

Fig. 14 is a vertical section of an apparatus with an additional small piston placed in the cylinder cover in order to increase or reduce the pressure at a given moment.

Fig. 15 is a vertical section of an apparatus, wherein the valves are replaced by pistons driven from the horizontal shaft.

Figure 16:
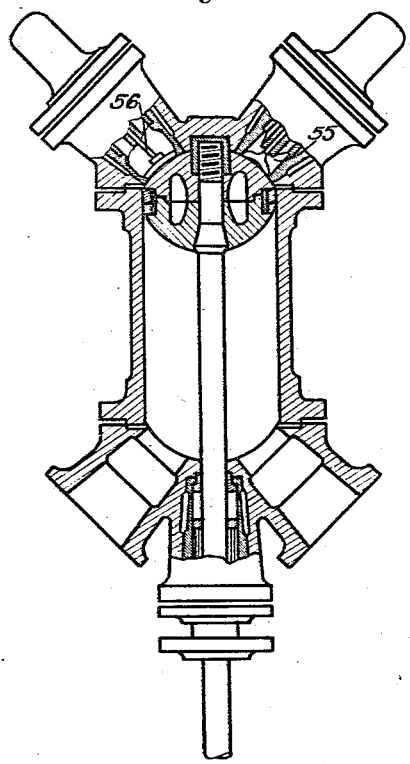

Fig. 16 is a sectional view of an apparatus in the form of a compressor of the usual type with valves operated automatically.

Fig. 17 is a sectional view of an apparatus with valves operated from the controlling shaft.

Fig. 18 shows an apparatus with slots in the lower part of the cylinder to work on a two-stroke cycle.

Figs. 19 and 20 show, respectively, in vertical and horizontal section, the apparatus, wherein an electric arc is introduced.

Fig. 21 is a similar sectional view, wherein a spark gap and a magnetic field is introduced.

Fig. 22 is a vertical section view of the apparatus with a separate chamber introduced in the cylinder, wherein the catalyst can be placed.

Figs. 23 and 24 are respectively, fragmentary side and plan view of this chamber for catalysts.

Fig. 25 is a vertical sectional view of the apparatus with an inner chamber formed by sheets constituting the catalyst and supplied with insulating layers.

Fig. 26 is a vertical sectional view of a horizontal apparatus, wherein the end compression space forms a separate chamber whose walls can be heated from without.

Fig. 27 shows the same apparatus as Fig. 26, except that the outlet valve is placed beyond the end compression chamber.

Fig. 28 shows the same apparatus as Fig. 27, except that it is supplied with a special chamber with a wire network, wherein a catalyst can be placed.

Fig. 29 is a front view of this chamber with the wire network.

Fig. 30 shows an apparatus in the form of a compressor, with mechanical means whereby the number of strokes between the admission and discharge of materials, can be varied.

Driving.

The driving is effected as usual for compressors by means of a motor through crank mechanism. If it is desired during a particular part of the stroke to attain a slower movement, other driving mechanisms may be used, such for example as a restricted crank mechanism. As many chemical reactions occupy rather a long time, the drive can be so effected that the slowly moving piston is stopped altogether at certain periods and is carried forward again after a certain time, which can be attained through automatically working couplings. The expansion of the material to be treated in the compressor can also be used to supply the driving power when it suffices for this.

The mean speed of the pistons, that is the speed of turning of the apparatus, must be suited to the chemical treatments contemplated.

If the apparatus is to be built for different chemical processes or as a research apparatus, the drive must be so effected that the speed of revolution can be varied.

This can be attained, firstly, by means of an electric motor of variable speed; secondly, by means of a drive through variable speed transmission mechanism such as toothed change wheel gearing or a belt and cone pulleys such as are usually employed in workshops.

Processes.

The apparatus can be constructed for different working processes according to the peculiarities of the operations to be carried out.

*I. Two-stroke cycle.* (Figs. 1, 5, 7, 9.)

According to this cycle the whole operation is effected in a to-and-fro movement of the piston. It can be carried out in the apparatus in various ways according to the materials to be operated upon.

Two-stroke A. (Fig. 1.)

Discharge of the materials in the outermost position of the piston: for carrying out this process the cylinder must be formed at its outer end with slots or valve openings which are exposed by the piston on reaching its extreme outermost position. According to this process the apparatus operates as follows:

*1st stroke.*—On the inward movement the piston compresses the materials introduced up to the necessary final pressure. During this compression or after its completion, further materials can be mixed in by the use of a higher pressure. After the action of any required physical agents the reaction takes place.

*2nd stroke.*—On outward movement of the piston the materials expand and escape through the slots when these are exposed, firstly through their own excess pressure and then through the pressure of the new charge being introduced. The new charge fills the cylinder and the operation is repeated.

This process is suited for chemical operations wherein the constant working conditions involve no sudden changes of pressure and temperature, and wherein the work done by expansion of the products can be used.

Two-stroke B. (Fig. 3.)

With discharge of the materials by the piston: according to this process the necessary final pressure is attained at some point in the inward stroke of the piston and in this position of the piston the reaction takes place. The other part of the movement of the piston inwardly is used for forcing out the materials operated upon. The operation is as follows:—

*1st stroke.*—On inward movement of the piston, during part of its movement, the materials in the cylinder are compressed up to the necessary final pressure, while further materials can be injected under a higher pressure. After the reaction has taken place, the materials obtained are ejected on the further movement of the piston.

*2nd stroke.*—During the outward movement of the piston the cylinder is filled with new materials to be treated.

This process is adapted for chemical operations for the maintenance of which no drop of pressure is allowable, or in which the products obtained are desired to be under pressure. The use of expansion for the regaining of work in the apparatus itself is not possible in this case.

Two-stroke C. (Fig. 5.)

Discharge of the products at the end of the inward movement of the piston.

According to this process the products obtained after the completion of the reaction are discharged at the end of the compression stroke, firstly by their own increased pressure and secondly by the excess pressure of the new mixture or of a separate scavenger. The operations are as follows:—

*1st stroke.*—On inward movement of the piston the materials introduced are compressed while further materials can be introduced under a higher pressure. At the end of the compression when the reaction has been completed, the resulting products escape, firstly through their own increased pressure into the receiver, and secondly through the excess pressure of the materials to be operated upon, or of an auxiliary displacing material.

*2nd stroke.*—During the outward movement of the piston the cylinder is filled with a new mixture.

This process is well adapted for cases wherein chemical action upon the walls of the apparatus is to be feared.

II. Four-stroke cycle. (Fig. 7.)

According to this method of working the sequence of operations is completed in two complete backward and forward movements of the piston. For the apparatus herein described the operations which take place in the strokes are as follows:

*1st stroke.*—On inward movement of the piston the materials contained in the cylinder are compressed. Either during or at the end of the stroke further materials can be introduced. At the end of the stroke the reaction must be completed.

*2nd stroke.*—The piston moves outwardly and the materials are expanded.

*3rd stroke.*—The piston again moves inwardly and the products are ejected.

*4th stroke.*—The piston moves outwardly and the cylinder is filled with a fresh charge of materials to be treated.

This process is well adapted for use in cases where sufficient time must be allowed for each stage of the process and where the recovery of mechanical work is considered important.

Vacuum process. (Fig. 9.)

Many chemical operations with physical actions necessitate no compression but rather expansion. The apparatus can be used for such cases. The operation with a two-stroke cycle is as follows:—

*1st stroke.*—On inward movement of the piston the materials received are compressed and escape under their own excess pressure, or through the pressure of the newly introduced materials, or under the scavenging action of auxiliary materials.

*2nd stroke.*—The piston moves outwardly and the materials in the radial compression space are expanded. At the end of this outward movement the necessary physical action can take place and the reaction is completed.

*Additional strokes.*—(Figs. 2, 4, 6, 8, 10.)—In all of the processes described, two, four, six and so forth additional strokes may be caused to take place in which the products already in the cylinder can be subjected to new compressions and new expansions. The addition of these further strokes can be effected as may be desired in order to mix the products better and to complete the chemical operations. During these additional strokes the final pressure and the temperature conditions can be varied, new materials can be added to those already operated upon, the resulting products may be removed from the apparatus as is described below, and the products can be subjected to additional physical actions.

Figure 2:
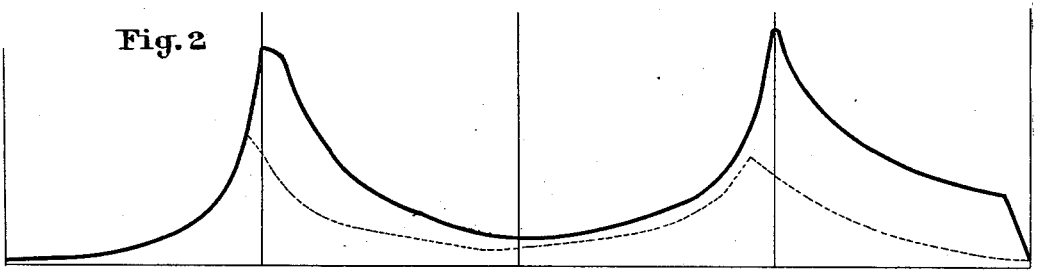

In the drawing: Figures 1 to 10 are diagrams of pressure conditions for all the above described processes, either without or with additional strokes, the full lines indicating exothermic, and the dotted lines endothermic chemical operations. Figure 1 shows the pressure diagram for the cycle of operations described under two-stroke A, with the escape of the products in the outward end position of the piston. Figure 2 shows the sequence of pressures for the same process but with two additional strokes.

Figure 4:
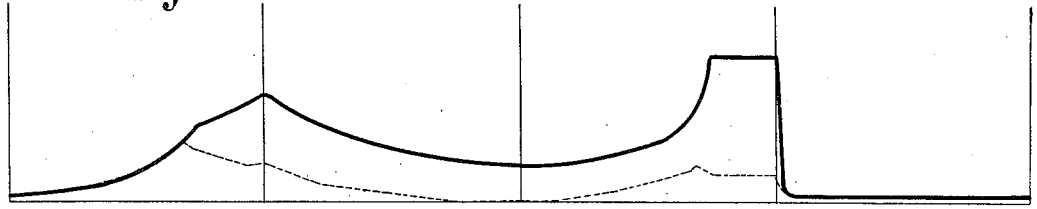

Figures 3 and 4 respectively show the same operations for the cycle two-stroke B, with the discharge of the products by means of the piston.

Figure 6:
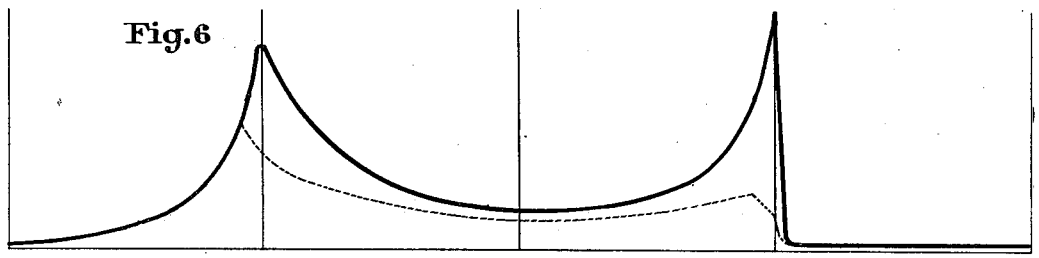

Figures 5 and 6 respectively show the same diagrams for the cycle two-stroke C, with the discharge of the products at the end of the inward movement of the piston.

Figure 8:
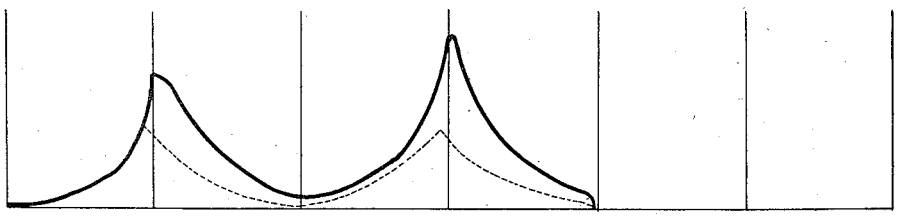

Figures 7 and 8 respectively show the same diagrams for the four-stroke cycle.

Figures 9 and 10 respectively show the same operations for the vacuum or reduced pressure cycle.

In all of these diagrams the pressure curve when the chemical reaction begins, rises during exothermic reactions, while the pressure rises, and falls during endothermic reactions with a fall of pressure, as compared with what is shown by corresponding compression and expansion curves without chemical reactions.

It is a matter of great importance however, whether the resulting products contain more molecules than those of the materials from which they are formed.

The additional strokes take place in the case of a two-stroke cycle between the two strokes of that cycle, while in the case of a four-stroke cycle they take place after the expansion stroke. The expansion curve in exothermic reactions on repetition of the compression always rises higher, while in the case of endothermic chemical reactions the curve always falls lower. The expansion curves are also similarly affected on repetition of the strokes, becoming less in the case of the exothermic reactions.

Mechanical apparatus for carrying out the process.

In Fig. 30 are shown those mechanical means by which the number of strokes between the admission and discharge of materials can be varied and whereby there can be realized the operation according to diagrams shown on the Figs. 1–10.

The worm wheel 42 on the main shaft of the compressor, by means of the worm wheel 43, drives the vertical shaft 44. The worm wheel 45 on the vertical shaft 44 drives, by means of the worm wheel 46, the horizontal cam-shaft 47 on which are positioned the cams 48 acting on the levers 49, which open the valves of the compressor.

Let the ratio of transmission between the main shaft and the vertical shaft 44 in all the following cases be 1:1.

If we then take the ratio of transmission between the vertical shaft 44 and the horizontal cam shaft 47 1:1, the admission and the discharge of materials will be repeated every two strokes of the piston and by variously arranging the cams we can realize the diagrams shown in Figs. 1, 3, 5 and 9.

If we take the ratio of transmission between the same shafts as 1:2, the admission and the discharge will occur every four strokes of the piston. By variously arranging the cams of the compressors we can realize the diagrams of Figs. 2, 4, 6 and 7.

If we take the ratio of transmission as it is made on the Fig. 30, 1:3 the admission and discharge will occur only every six strokes of the piston. We can realize then the diagram of Fig. 8.

If we take the ratio of this transmission as, 1:4, 1:5 etc., we can place between the admission and the discharge of the materials as many strokes as desired.

In apparatus wherein the ejection of the products is to take place through slots exposed by the piston in its outermost position the slots must be blocked when additional strokes are to be effected. For this purpose the construction shown in Figures 11 and 12 in vertical section and horizontal section respectively can be used. The ring 13 makes a to-and-fro movement, opening and closing the slots at the right times. This to-and-fro movement is effected from the controlling shaft by means of teeth 14, worm wheel 15 and lever 16. The ring turns upon steel balls 51. If the width of the slots is small, the path of movement of the ring can be small. The packing of the ring is effected by means of inserted packing rings 52.

In many of the processes above described especially in two-stroke B (ejection of the products by the piston), the final compression pressure may be found to be needlessly high when additional strokes are employed. In many chemical processes it may be necessary to attain a certain determined pressure at this stage. In order to attain the necessary final pressure the construction of Figure 14 may be used. A small piston 18 is provided in the end compression space, and this piston by its reciprocating movement increases or reduces the end compression at the required period in order to attain the desired final pressure.

The piston is driven from the controlling shaft 53 by the eccentric 54 or the main shaft in any suitable manner.

The separation of liquids of the reacting chemical materials can be accomplished by the construction of Figs. 11, 12, whose action is shown on Figs. 13$^a$ and 13$^b$.

The vertically moving piston is provided with a conical end. The liquid introduced in a small quantity, or else formed by the chemical process, will collect around the edges of the piston and on exposure of the slots as shown in Fig. 13$^a$ the liquid will be ejected by the pressure of the gas in the slots. The liquid will collect in the spaces 50. The escape of the gases however, will be prevented by the ring 20, which in the position shown, blocks up the slots. When the piston in going upwards covers the slots as is shown in Fig. 13$^b$ the ring will be turned and the slots will be opened in order to allow the liquid to be removed from the apparatus, while the gases are blocked up by the piston.

*General arrangement of the apparatus.*

Some constructions of the apparatus are shown in Figures 16, 17 and 18.

In Figure 16 a compressor is shown of a usual type. The piston rod is actuated in any suitable manner. The inlet and the outlet valves 55 and 56 are operated automatically. The compressor is shown as double-acting.

In Figure 17 a stationary compressor is shown driven by a belt pulley 57. The inlet and the outlet valves 58 and 59 are operated mechanically in any suitable manner. A valve or a spraying device can be inserted in the opening 24.

Figure 18 shows a stationary apparatus with slotted openings 60 as required for two-stroke cycle A.

In all of these constructions the end compression space 61 forms part of the cylinder space. In the constructions of Figures 26, 27 and 28, the end compression space 62 forms a separate chamber, which is preferable for certain purposes. For many chemical operations it is necessary for the end compression space to contain glowing surfaces, which is easily attained in the construction of Figures 26, 27 and 28. If the end compression space 62 is formed of cast-iron or other suitable material, its wall can be heated to a glowing temperature by external burners. If the generation of heat by the chemical reactions during the operation of the device is not sufficient to maintain the walls in a glowing condition, this can be attained by external heating.

In chemical reactions in which much heat is developed, glowing walls can also be used in the constructions of Figures 16, 17 and 18. Figure 25 shows such an arrangement, The piston cover 63, the cover of the cylinder 64 and the upper parts of the cylinder walls 65 are covered with layers of a suitable material which may be insulated from the walls by different materials 66. If a large amount of heat is developed in a chemical reaction, these surfaces are maintained in a glowing condition without interfering with the movements of the piston. Such glowing inner walls may be of great use for chemical reactions. The same construction can also be used in internal combustion engines.

When electric arcs, spark gaps and so forth are to be used in the apparatus, the coverings of the inner surfaces may be of porcelain, earthenware or other electric non-conducting and heat insulating materials.

In Figures 27 and 28 a construction is shown in which the outlet valve 67 is beyond the end compression space 62, which ensures the satisfactory ejection of the resulting products, and renders possible the effective scavenging of the compression space. This construction may also be of use in internal combustion engines. The inlet valves in Figs. 26, 27 and 28, are shown by the number 68.

Figure 15 shows a construction of the apparatus in which the valves are replaced by small pistons 30 driven from the controlling shaft 69 by the eccentrics 70. These pistons expose at the right moment in their movement slots 31 through which the products can enter or leave the apparatus.

This construction can also be used in other compressors and in internal combustion engines.

Obviously the above described forms of apparatus can be made double-acting. The lower structure of the casing can also be used as a feed pump.

*The introduction and removal and mixing of the materials.*

The materials necessary for the chemical operation can be introduced into the apparatus from gas containers, vaporizers, or other receptacles under sufficient pressure, or they can be drawn into the apparatus by suction. The feeding in of the materials is effected in the known manner by valves or slots. Each reagent may be introduced through a separate valve whose period of opening is adjusted to allow the passage of the necessary amount of the reagent, or several reagents may be introduced through one valve. Liquids or pulverized materials can be introduced by means of pumps or through the action of gases at a sufficient pressure in spraying devices. The period of introducing the materials can be suited to the chemical reactions. The mixing of the materials can be effected by mixing valves and by injecting them under higher pressure. A good mixing can be effected in the known manner by spraying devices operating under a higher pressure. The additional operating strokes when used provide good means of attaining the effective mixing up of the materials. The ejection of the products has already been dealt with above. They can be received into purifiers, separators, or direct into containers.

*Introduction of physical agencies.*

Many chemical reactions only take place, as is known, under the action of physical agencies such as electric arcs, spark discharges, radiations of various kinds, glowing surfaces, igniting sparks and so forth.

In order to subject the materials to such actions the apparatus is provided with openings 71 for their admission. Figures 19 and 20 show the introduction of an electric arc 35, while Figure 21 shows a spark gap 36 and a magnetic field 37.

It may be necessary that the action of the physical agencies should be interrupted and again renewed at any stage in the operation. This can be effected by interruption of the electric current by the controlling mechanism, as in engines.

In the case of electric arcs and spark gaps, the bringing together and subsequent separation of the carbons or electrodes may be necessary. This can be effected by the controlling mechanism, as is indicated in Figures 19 and 20. Ignition can be produced in the usual manner for instance by the lever 72 and the cam 73 by sparking plugs, glowing surfaces, tube igniters and so forth. Chambers with glowing walls have also been described above.

*Catalysts.*

Many chemical reactions are only possible in practice, or they take place much more quickly in the presence of a catalyst such as platinum, spongy platinum, copper, nickel, porcelain granules, pumice stone, and so forth.

If the catalysts can be used in the form of sheets they may constitute an inner chamber, as is shown in Figure 25, with or without insulating layers. If the catalyst is in another form it can be arranged as shown in Figure 22, in a separate chamber 39 behind a network 74 of platinum or other wire capable of withstanding the conditions. Figs. 23 and 24 are respectively fragmentary side and plan views of this chamber 39. In horizontal constructions of the apparatus, as in Figures 26, 27 and 28, the catalyst may be disposed on the bottom of the compression chamber 40, or in any other easy and convenient manner.

Figure 28 shows an arrangement in which the materials are compelled to pass through a layer of a catalyst disposed between wire network 75 of the ring 41. Fig. 29 shows a side view of this ring 41.

*Pressure and temperature.*

The attaining of any desired high end pressures and temperatures, or low pressures and temperatures is easily possible by means of the apparatus.

If the end compression space should be too small for any required final pressure when made of the size required from other points of view, this end pressure can be made to be suitably higher or lower if the materials are introduced into the apparatus under a higher or lower pressure than atmospheric.

Another means of attaining very high or very low end pressures and temperatures is provided if strong exothermic or endothermic reactions take place simultaneously with the operations which have to be effected in the same cylinder.

The above described construction of Figure 17 having an auxiliary piston provides the possibility of increasing or reducing the pressure at any desired moment during the operation.

The heating or cooling of the cylinder walls in a suitable manner by circulation in jackets of warm or cold fluids or vapours also provides a means for raising or lowering to a certain extent the temperature of the contained materials.

If the apparatus is specially designed for experimental purposes, the end pressure can be made variable by making the length of the piston rod variable by insertion pieces for example.

*The prevention of chemical action upon the walls.*

The materials of which the apparatus is constructed can be suitably selected, or coverings of suitable materials can be provided according to mechanical operations to be carried out.

The above described two-stroke cycle C in which the resulting products are ejected in the innermost position of the piston by the fresh charge entering, or by a suitable auxiliary discharging medium, provides a means of avoiding deleterious chemical actions on the apparatus itself.

The end compression space may also be coated with a suitable material, as is indicated in Figure 25. This can also be done with the valves, slots, passageways and so forth.

*Mechanical work.*

Mechanical work is needed, as is known, during compression but is given out during expansion.

In exothermic operations the work done on expansion is generally greater than that required on compression, and hence in chemical operations mechanical work can be recovered as a by-product. In this case the amount of one of the reagents introduced will generally be controlled by the action of a speed regulator.

In endothermic chemical reactions the work done on expansion will generally be less than that on compression and the apparatus must then be driven by external power.

In reduced pressure operations work has to be done in expanding against the air pressure while work is recovered in compression by the air pressure. In exothermic chemical reactions the work required will generally be greater, and the apparatus must be driven externally. In endothermic chemical reactions the opposite is the case. The work necessary for overcoming the air pressure will be less than the work done by the air pressure. Mechanical work can be recovered through any reduced pressure operations even when endothermic chemical reactions are involved. Operations involving expansion render it possible in the case of endothermic reactions to use the drop in temperature for the recovery of mechanical work.

*Applications of the invention.*

The apparatus as above described can be used for the industrial preparation of many chemical products. It can, for example, be used for the production of nitrogen-oxygen compounds and other inorganic bodies.

The apparatus can also be used for the formation, dissociation or conversion of organic bodies, and their synthesis from their elements and from inorganic compounds.

The apparatus can also be used as a general laboratory research device. For this purpose, it must be so built that adjustments can be effected at any time for chemical reactions involving changes at any moment. Provision must be made for varying the operations, the strokes, the speed of revolution, the end pressure, the end temperature and so forth. The physical agencies, catalysts, interior coverings and so forth must also be easily interchangeable. The means for this purpose have been described above.

*Cracking or dissociation of heavy hydrocarbons.*

The apparatus can be used for the cracking of mineral oils, tars, their distillates and other complicated organic bodies, for the obtaining of less complicated hydrocarbons. This cracking can be effected in the apparatus of Fig. 17 as follows:

On the outward stroke of the piston the cylinder becomes filled with water vapour through the inlet valve 58, while on the inward stroke the vapour is compressed by the piston until the desired pressure and temperature are obtained. Then the oil is introduced by means of a vapour or gas at a still higher pressure through an injector as in the Diesel motor through the valve 24. The oil is cracked by the temperature and high pressure in the known manner. The ejection of the products is effected by one of the processes above described through the valve 59. The resulting products pass out and are separated in known ways.

If more unsaturated or partially oxidized products are to be obtained, the cracking process can be effected in an atmosphere of CO or $CO_2$, or with the mixing in of air, when the piston is made to draw in CO or $CO_2$ from a generating plant, or air, instead of water vapour.

If more hydrated products and saturated hydrocarbons are required, the cracking process can be effected in an atmosphere of hydrogen when the piston will draw in the hydrogen from a container or from a generating plant.

The cracking process can also be effected in the atmosphere of another neutral or chemically active gas or vapour.

The introduction can be effected by the same vapour or gas in which the cracking process takes place, or by means of another neutral or reacting vapour or gas.

Physical or catalytic agencies can also be brought into play as above described. For the attainment of higher temperatures and pressures, or for the recovering of work, or for the recovering of carbon dioxide, a part of the product to be cracked can be caused to be burnt by the introduction of air. In this manner it is possible to crack easily petroleum, coal tar, lignite tar, higher fatty acids, carbohydrates, and other complicated organic bodies.

The apparatus can also be used in this manner as a simple distillation plant if the fluid in question is introduced into the apparatus in a completely vaporized condition and is externally fractionated.

Fatty acid esters and other esters can be converted in this manner into compressed vapour. Unsaturated fatty acids and other unsaturated hydrocarbons can be hydrated in this manner in an atmosphere of hydrogen, with or without catalysts, to form saturated fatty acids and hydrocarbons.

As will be seen clearly from the example above set forth the apparatus can be used for the carrying out of practically all chemical reactions, such as the production of soda, chlorine, etc.

The apparatus can also be used for general laboratory research purposes. For this purpose it must be so constructed that adjustments can be effected for all the requirements of the various chemical processes. The sequence of operations, the number of strokes, the speed of revolution, the end pressure and the temperature must all the made variable. The physical agencies such as the catalysts and the linings of the reaction chambers must be made readily interchangeable. The means for this purpose are set forth above.

Having thus described my invention what I claim as new and desire to secure by Letters Patent is:—

1. An apparatus for producing chemical materials, comprising, an externally driven compressor having a piston adapted to take in predetermined quantities of reagents, to compress the reagents up to the necessary pressure and temperature according to the chemical reactions involved, and after completion of the chemical reactions, to discharge the products, and to take in a new charge of materials to be acted on.

2. An apparatus for producing chemical materials, comprising, an externally driven compressor having a piston and cylinder, a compression space at the head of the cylinder, means for admitting materials to be acted on, means for controlling discharge of the resulting products, and connections to the compression space to permit of subjecting the materials therein to the action of electrical energy.

3. An apparatus for producing chemical materials, comprising, an externally driven compressor having a piston and a cylinder, a compression space at the head of the cylinder, means for admitting to the cylinder materials to be acted on, means for controlling discharge of products from the cylinder, and means in the compression space for producing variation of the final pressure and temperature therein.

4. An apparatus for producing chemical materials, comprising, an externally driven compressor having a piston and a cylinder, a compression space at the head of the cylinder, means for controlling admission to the cylinder of materials to be acted on, means for controlling discharge of products from the cylinder, said admission and discharge controlling means being such that the number of strokes which the piston makes between the admission and the discharge can be varied according to requirements.

5. An apparatus for producing chemical materials, comprising, an externally driven compressor having a piston and a cylinder, a compression space at the head of the cylinder, means for controlling admission of materials to be acted on, means for controlling discharge of the products, said admission and discharge controlling means being such that the number of strokes which the piston makes between the admission and the discharge may be varied according to requirements, and means for discharging liquid products from the compression space while preventing the escape of gaseous and vaporous materials therein.

6. An apparatus for carrying out cracking reactions on hydrocarbons, comprising, an externally driven compressor having a piston, a cylinder receiving the piston, said cylinder being adapted to compress a gas, and means for introducing liquid hydrocarbon, by overpressure of a gas, at the beginning of the expansion stroke of the piston.

MARCUS BRUTZKUS.